(12) United States Patent
    Iustin

(10) Patent No.: US 12,573,249 B2
(45) Date of Patent: Mar. 10, 2026

(54) SENSOR LOCALIZATION USING AN ASSEMBLY LINE TOOL

(71) Applicant: Volvo Truck Corporation, Gothenburg (SE)

(72) Inventor: Roman Iustin, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 72 days.

(21) Appl. No.: 18/584,523

(22) Filed: Feb. 22, 2024

(65) Prior Publication Data

US 2024/0290145 A1     Aug. 29, 2024

(30) Foreign Application Priority Data

Feb. 28, 2023     (EP) ..................................... 23159149

(51) Int. Cl.
    *G07C 5/08*          (2006.01)
    *B60C 23/04*         (2006.01)
    *B62D 65/00*         (2006.01)

(52) U.S. Cl.
    CPC ........ *G07C 5/0808* (2013.01); *B60C 23/0481* (2013.01); *B62D 65/005* (2013.01)

(58) Field of Classification Search
    CPC ...... G07C 5/08; G07C 5/0808; B62D 65/005; B60C 23/04; B60C 23/0472; B60C 23/0416; B60C 23/23; B60C 23/0479; B60C 23/0481; B60C 25/05; B60C 25/0548

(Continued)

(56) References Cited

U.S. PATENT DOCUMENTS

| | | | | |
|---|---|---|---|---|
| 11,016,051 B1* | 5/2021 | Sinko | ........................ | B32B 3/08 |
| 11,958,321 B2* | 4/2024 | Kolych | ................. | B60C 23/045 |

(Continued)

FOREIGN PATENT DOCUMENTS

| | | |
|---|---|---|
| EP | 4101662 A1 | 12/2022 |
| JP | 2012126341 A | 7/2012 |

(Continued)

OTHER PUBLICATIONS

Extended European Search Report, European Application No. 23159149, mailed Jul. 13, 2023, 7 pages.

*Primary Examiner* — Andrew Joseph Rudy
(74) *Attorney, Agent, or Firm* — Sage Patent Group

(57)     ABSTRACT

The disclosure relates to a diagnostic system for verifying functionality and performing mapping of a wireless sensor in/on a wheel of a heavy-duty vehicle on an assembly line (100), the system including:

an assembly-line tool provided along the assembly line, each tool comprising one or more antenna systems arranged to interrogate a wireless sensor integrated into/on a wheel of the vehicle, each tool is arranged in use to:

automatically locate on the vehicle and verify a function of the sensor; and interrogate the sensor to perform a wireless sensor reading; and pair sensor reading data with a tire identifier, pair sensor reading data with a vehicle chassis ID, wherein the diagnostic system maps the sensor using sensor readings and provides mapping information for the sensor to a gateway/receiver of an electronic control unit of the vehicle.

15 Claims, 6 Drawing Sheets

(58) Field of Classification Search
USPC ........................................................ 701/29.6
See application file for complete search history.

(56)                          References Cited

U.S. PATENT DOCUMENTS

| | | | | |
|---|---|---|---|---|
| 12,103,339 B2 * | 10/2024 | Iustin | .................. | B60C 23/0447 |
| 12,319,099 B2 * | 6/2025 | Iustin | .................. | B60C 23/0462 |
| 2008/0143507 A1 | 6/2008 | Cotton | | |
| 2019/0126694 A1 | 5/2019 | Stewart | | |
| 2021/0221457 A1 | 7/2021 | Wen | | |

FOREIGN PATENT DOCUMENTS

| | | | | | |
|---|---|---|---|---|---|
| WO | WO-2011061455 A1 * | 5/2011 | ......... | B60C 23/0408 |
| WO | 2021251943 A1 | 12/2021 | | |

* cited by examiner

400

SENSOR LOCALIZATION USING AN ASSEMBLY LINE TOOL

CROSS REFERENCE TO RELATED APPLICATIONS

This application claims priority to European Patent Application 23159149.6, filed on Feb. 28, 2023, the disclosure and content of which is incorporated by reference herein in its entirety.

TECHNICAL FIELD

The disclosure relates generally to assembly of vehicles. In particular aspects, the disclosure relates to sensor localisation using an assembly line tool. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicles, such as heavy-duty vehicles, might have integrated wireless sensors and gateways/receivers designed to read such sensors and forward data to electronic control units (ECUs). During factory assembly of the vehicle, such gateways/receivers require mappings, in terms of reading an identification (ID) of a specific sensor and its location on vehicle.

Example of such a system of integrated wireless sensors and gateways/receivers is the tire Pressure Monitoring (TPM) ECU designed to read sensors integrated in tires. Each sensor has a unique ID. The TPM ECU needs to be informed of all IDs of the tire sensors and their locations on the vehicle chassis.

Today, the ID and the location of sensors are read manually by scanning each tire (e.g., indirectly by optical scanning of labels, QR codes or directly by activation of the sensor). Alternatively, the TPM ECU might have an auto location functionality where the location of each sensor is determined by the ECU. However, the auto location functionality is only deployed during vehicle movement, i.e., when the wheel is rolling. Additionally, this method requires other sensor data such as a wheel speed reading from each vehicle axle provided by the Electronic Brake System (EBS) ECU. Auto location of a sensor may take up to 10 minutes of continuous driving at different speeds. For an assembly line, it is important to get all diagnostics and parameter settings done before the vehicle leaves the line.

There is thus a need for an improved way of mapping sensor ID with location on the vehicle onto which it is assembled.

SUMMARY

According to a first aspect of the disclosure, a diagnostic system for verifying functionality and performing mapping of one or more wireless sensors in or on a wheel of a heavy-duty vehicle on an assembly line, comprises:

one or more assembly-line tools provided along the assembly line, each assembly-line tool comprising one or more antenna systems arranged to interrogate one or more wireless sensors integrated into or on a wheel of the vehicle, wherein each assembly-line tool is arranged in use to:

automatically locate on the vehicle and verify a function of the one or more wireless sensors; and interrogate at least one of the one or more wireless sensors to perform a wireless sensor reading; and pair sensor reading data with a tire identifier, pair sensor reading data with a vehicle chassis ID, wherein the diagnostic system maps one or more sensors using wireless sensor readings and provides mapping information for the one or more sensors to a gateway/receiver of an electronic control unit of the vehicle. The first aspect of the disclosure may seek to simplify pairing and mapping of vehicle sensors with the vehicle's electronic control unit (ECU). A technical benefit may include reducing the time needed to pair and map sensors of a vehicle tire with the vehicle on which it is assembled. With mapping is meant that one or more integrated gateways of the vehicle under assembly that provides data to the vehicle's sensor ECU is supplied with this info.

In some examples, optionally the assembly line tool comprises a spindle tool configured to bolt vehicle wheels to a vehicle chassis or a wheel lift configured to lifting vehicle wheels onto an axle of a vehicle chassis. A technical benefit may include the possibility to use a variety of tools to perform the mapping during various stages of assembly. In this way, mapping can take place where it is most effective.

In some examples, optionally the assembly line tool is configured to interrogate one or more axle position sensors on a vehicle on the assembly line. A technical benefit may include to easily obtain data for where the wireless sensor is located on the vehicle chassis. Axle position sensors are for instance integrated into the wheel hubs of the chassis of the vehicle.

In some examples, optionally the assembly line tool is configured to interrogate one or more axle position sensors, and store data that pairs the axle position of the spindle-tool with the sensors detected at that location. A technical benefit may include effective mapping of a specific sensor with a specific axle of the vehicle chassis.

In some examples, optionally the assembly line tool is further configured to activate a diagnostic mode of a tire pressure and/or tire temperature sensor system of the vehicle on the vehicle assembly line. A technical benefit may include to check the functionality of the sensor at the same time or close in time with the mapping of the sensor.

In some examples, optionally one of the antenna systems provided on the assembly line tool comprises a plurality of low frequency antennas spaced around the assembly line tool so as to provide at least one antenna at a location sufficiently close to a tire pressure and temperature sensor to perform a reading of data provided by the tire pressure and sensor. A technical benefit may include that the tool will be able to read the sensor no matter its orientation if sufficiently close enough to the wheel.

In some examples, optionally the data provided by the tire pressure/temperature sensor (TPS) includes a TPS identifier (TPS_ID). A technical benefit may include easy identification of the sensor.

In some examples, optionally the assembly line tool is configured to read one or more RFID tags located in a vehicle tire or wheel rim. A technical benefit may include easy access to the RFID information of the tire for future use. The assembly line tool may also be configured to read the axle location/position info from an axle position sensor.

In some examples, optionally the assembly line tool configures each TPS_ID to be associated with a vehicle tire RFID and/or a vehicle chassis ID. A technical benefit may include quick pairing of the TPS_ID with the tire RFID or vehicle chassis ID. The assembly line tool may also be configured to associate the axle location/position info from an axle position sensor with the TPS_ID.

In some examples, optionally the assembly line tool stores data that pairs each TPS_ID with a vehicle tire RFID and/or with a vehicle chassis ID. A technical benefit may include that only the tire RFID is needed to which sensor or sensors are present in the tire.

According to a second aspect of the disclosure, an assembly-line tool for verifying functionality and performing mapping of one or more wireless sensors in a heavy-duty vehicle on an assembly line at assembly time, the tool comprising: one or more antenna systems arranged to interrogate one or more wireless sensors integrated into or on the vehicle, wherein the assembly-line tool is configured in use to:

> automatically locate and verify a function of the one or more wireless sensors; and interrogate at least one of the one or more wireless sensors to perform a wireless sensor reading;
> pair sensor reading data with tire identifier; and
> pair sensor reading data with a vehicle chassis ID,
> send the wireless sensor reading to a diagnostic system configured to determine mapping information for the one or more sensors. The second aspect of the disclosure may seek to reduce the time needed for mapping tire sensors to the correct location in a vehicle. A technical benefit may include to provide a tool that will speed up the identification and pairing of tire sensor information with the vehicle chassis identification during assembly.

In some examples, optionally the assembly line tool comprises a spindle tool configured to bolt vehicle wheels to a vehicle chassis or a wheel lift configured to lifting vehicle wheels onto an axle of a vehicle chassis and interrogate one or more axle position sensors on a vehicle wheel of a vehicle on the assembly line. A technical benefit may include A technical benefit may include the possibility to use a variety of tools to perform the mapping during various stages of assembly. In this way, mapping can take place where it is most effective.

In some examples, optionally the assembly line tool is configured to interrogate one or more axle position sensors on a vehicle wheel of a vehicle on the assembly line, and stores data which pairs the axle position of the spindle-tool with the sensors (TPS/RFID) detected at that location. A technical benefit may include quick access to the axle position for pairing with the sensor identification.

In some examples, optionally the assembly line tool is further configured to activate a diagnostic mode of a tire pressure and/or tire temperature sensor system of the vehicle on the vehicle assembly line. A technical benefit may include to check the functionality of the sensor at the same time or close in time with the mapping of the sensor.

In some examples, optionally one of the antenna systems provided on the spindle tool comprises a plurality of low frequency antennas spaced around the spindle tool so as to provide at least one antenna at a location sufficiently close to a tire pressure and temperature sensor to enable the spindle tool to:

> perform a reading of data provided by the tire pressure and sensor, wherein the data provided by the tire pressure/temperature sensor (TPS) includes a TPS identifier, TPS_ID; read one or more RFID tags located in a vehicle tire or wheel rim;

associate each TPS_ID with a vehicle tire RFID and/or a vehicle chassis ID; and
store, or send for storage on another apparatus, data pairing each TPS_ID with a vehicle tire RFID and/or with a vehicle chassis ID. A technical benefit may include A technical benefit may include that the spindle tool will be able to read the wireless sensor no matter its orientation if sufficiently close to the wheel.

The disclosed aspects, examples and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
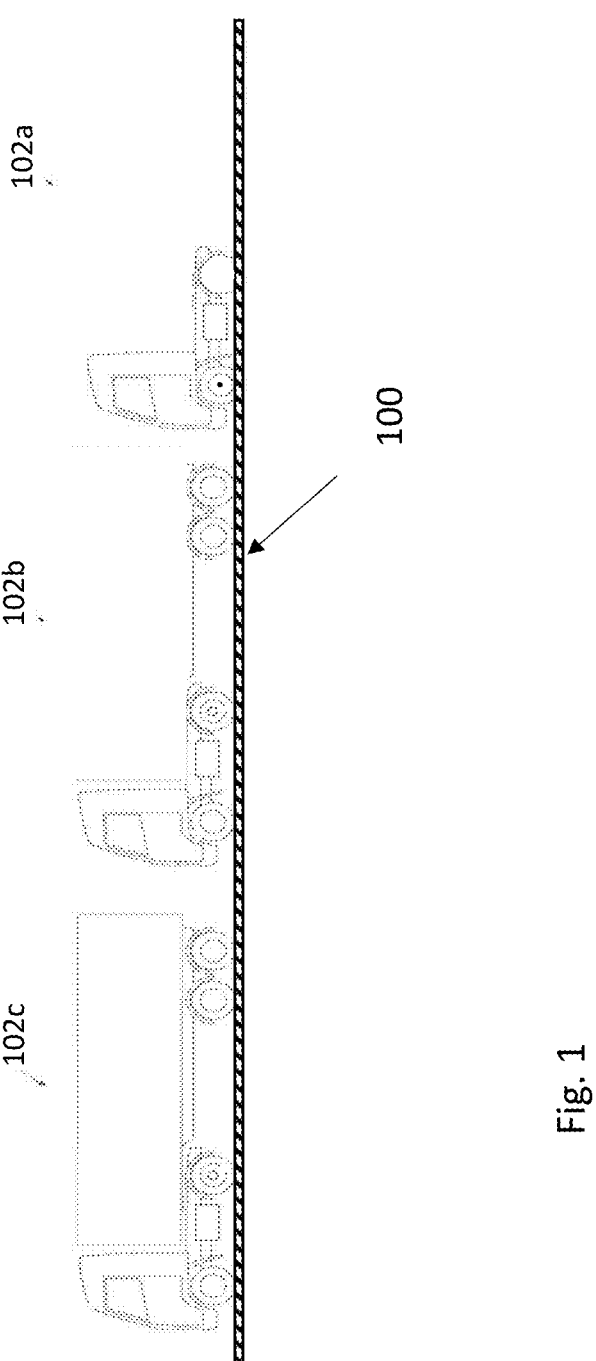
FIG. 1 is an exemplary overview of a manufacturing line for heavy-duty vehicle.

FIG. 1 is an exemplary overview of a manufacturing line for heavy-duty vehicles. In FIG. 1, an assembly line 100 can be seen with vehicle 102a, 102b, 102c in different stages of completion.

Figure 2:
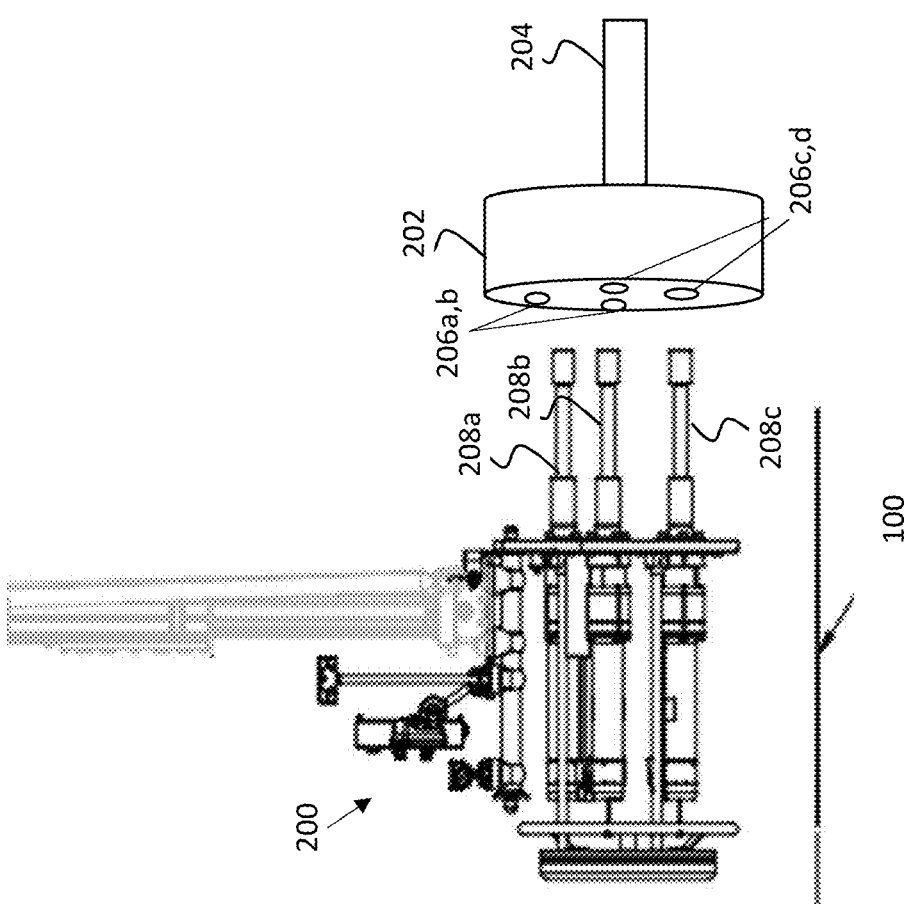
FIG. 2 is an exemplary overview of an assembly-line tool for verifying functionality and performing mapping of one or more wireless sensors in a heavy-duty vehicle on an assembly line at assembly time.

FIG. 2 is an exemplary overview of an assembly-line tool for verifying functionality and performing mapping of one or more wireless sensors in a heavy-duty vehicle on an assembly line at assembly time. A diagnostic system 200 is arranged on an assembly line tool arranged to interact with a wheel 202. The wheel 202 is arranged on an axle 204 of a vehicle 102 to be assembled or arranged to be mounted onto the axle 204. The wheel comprises a number of tire sensors 206a,b,c,d; for instance temperature and pressure sensors (TPS). The assembly line tool is in the present example a spindle tool 208 arranged to tighten bolts of the wheel 202. The spindle tool is also called a nut runner. Spindle tools or nut runners may have several spindles, e.g., from one to five. The assembly line tool can also be a wheel lift configured to lift a vehicle wheel onto the axle 204.

In the spindle tool 208, an antenna or an array of antennas are integrated and configured to automatically read data from one or more wireless sensors provided on or in the vehicles being assembled. In this example, the wireless sensor is a tire sensor. The vehicles under assembly have integrated gateways that provide data to the vehicles sensor ECU. By integrating an antenna or antenna array into an assembly line tool that is configured to read the sensor identification of each specific tire sensor and to determine its location on the vehicle and export the data, mapping and subsequent diagnostics can be performed more quickly. This improves the way that such sensors can be mapped for vehicle diagnostics by locating and verifying the positions and identities of wireless sensors using an antenna or antenna array located in an assembly line environment. By locating is meant finding the location of the sensor on the vehicle chassis, i.e., the location on which axle that the specific sensor ID is assembled.

Figure 3:
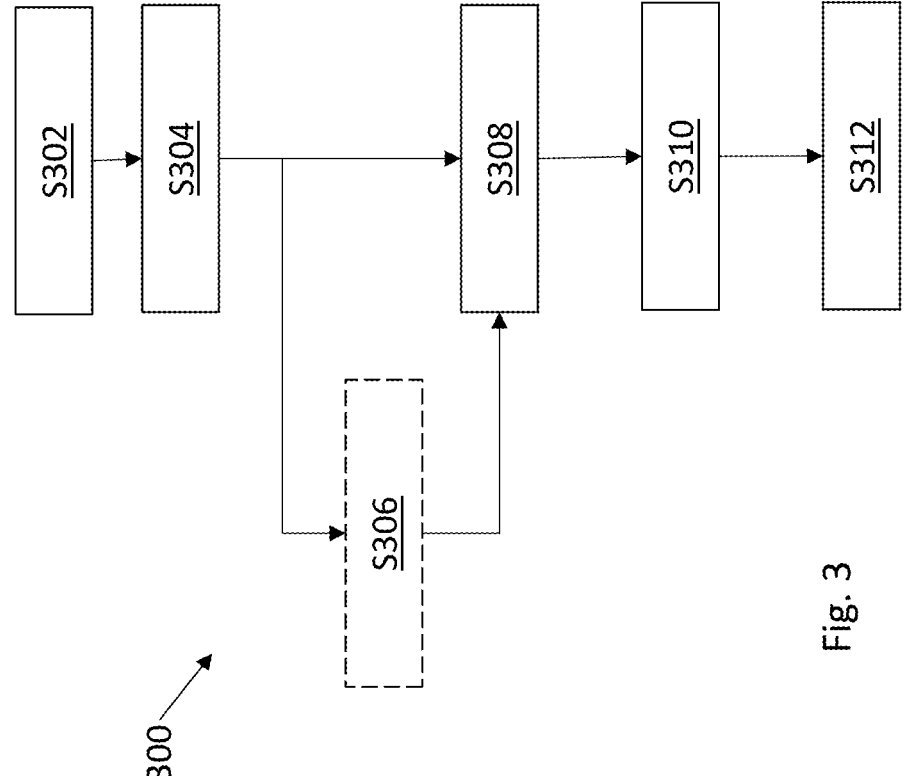
FIG. 3 is a flowchart of an exemplary method for pairing one or more tire sensors with a tire ID of a tire on a vehicle whilst the vehicle is on its assembly line.

FIG. 3 is a flowchart of an exemplary method 300 for pairing one or more tire sensors with a tire ID of a tire on a vehicle whilst the vehicle is on its assembly line. The method 300 may comprise the following actions, steps or operations.

Action 302. A wireless sensor is located and the functions of the sensor are verified. Action 304. The sensor is interrogated to read the tire pressure and temperature (TPS) values as well as the identification information of the sensor (TPS_ID). Action 308. The tire RFID is read and the TPS_ID and the tire RFID is paired. Further, an axle position sensor is interrogated and is paired with the tire sensor ID (TPS_ID) with its location on the vehicle chassis. Thus, two pairings are made: one pairing is to pair the tire sensor ID to the RFID of that specific tire and another pairing is to pair the sensor ID to the axle position on a chassis ID. Action 310. The pairing data of the tire RFID and the TPS_ID and the tire RFID and the chassis ID is stored, or sent for storage on another apparatus. Action 312. The stored pairing data is sent to a diagnostic system.

Action 306. Optionally, more than one sensor value and identification can be read by interrogating a further sensor. If this is the case, all sensor identifications are paired with the tire RFID, stored, or sent for storage, and thereafter sent to the diagnostic system.

Figure 4:
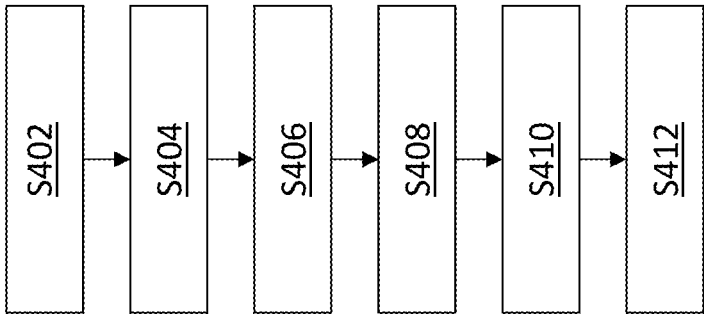
FIG. 4 is a flowchart of an exemplary method for verifying functionality and performing mapping of one or more wireless sensors in or on a wheel of a heavy-duty vehicle on an assembly line.
Figure 4:

FIG. 4 is a flowchart of an exemplary method for verifying functionality and performing mapping of one or more wireless sensors in or on a wheel of a heavy-duty vehicle on an assembly line. The method 400 may comprise the following actions, steps or operations. Action S402. The wireless tire sensor is activated and set into diagnostic mode using an assembly line tool. Action S404. The wireless tire sensor is interrogated to read sensor identification and diagnostic data. Action S406. Reading a tire RFID. Action S408. The sensor identification and diagnostic data of the wireless tire sensor is paired with the tire RFID. Also, the sensor identification and diagnostic data is paired with a vehicle chassis ID. Action S410. The sensor(s) are mapped using the obtained pairing data. Action S412. The sensor mapping data is sent to the appropriate vehicle electronic control unit.

Figure 5:
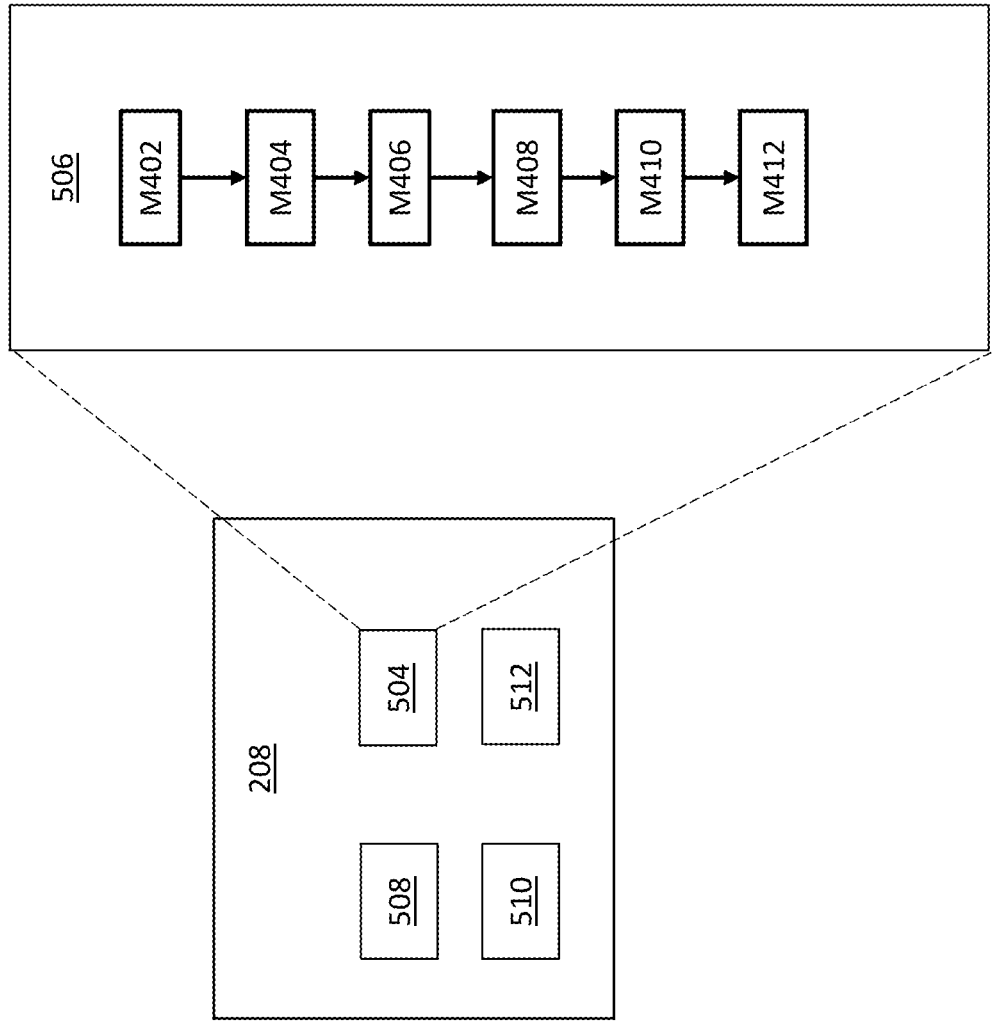
FIG. 5 is an exemplary overview of a diagnostic system for verifying functionality and performing mapping of one or more wireless sensors in or on a wheel of a heavy-duty vehicle on an assembly line.

FIG. 5 is an exemplary overview of a diagnostic system 500 for verifying functionality and performing mapping of one or more wireless sensors in or on a wheel of a heavy-duty vehicle on an assembly line. The diagnostic system 500 comprises a controller 502 configured to connect the diagnostic system to the spindle tool or wheel lift of the assembly line arrangement 200. The system 500 further comprises a memory 504, computer code 506, one or more processor(s) or processing circuitry 508, and a data communications transceiver arrangement 510 connected to an antenna 512.

The computer code, when loaded from memory 504 and executed by the one or more processors or processing circuitry 508, causes the diagnostic system 500 to wirelessly connect to the spindle tool or wheel lift and perform the actions, steps or operations of the methods described above.

Figure 6:
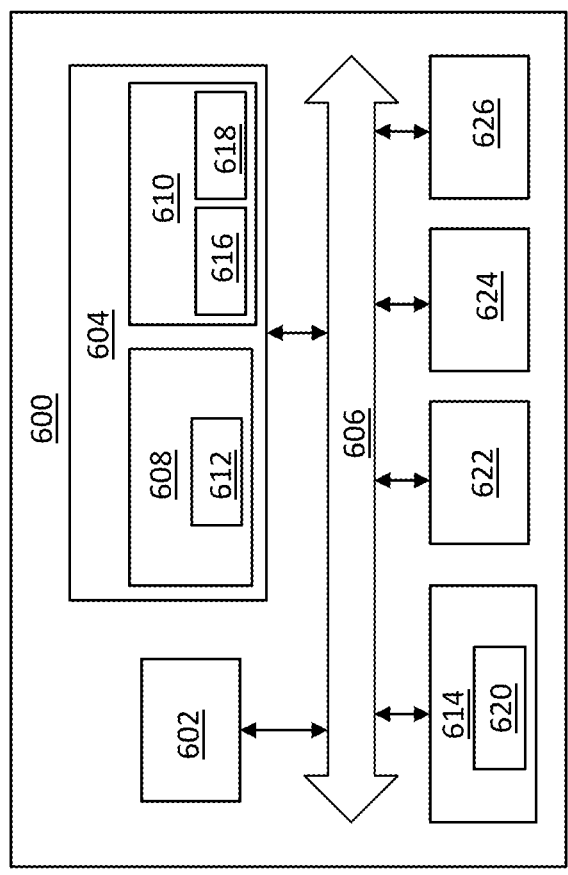
FIG. 6 is a schematic diagram of an exemplary computer system for implementing examples disclosed herein.

FIG. 6 is a schematic diagram of an exemplary computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 605 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 605 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 615. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system

600 may also include a communications interface 626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Example 1: A method for pairing one or more tire sensors with a tire RDID of a tire on a vehicle and a vehicle chassis ID during assembly of vehicle, wherein the method comprises:

Locating a first tire sensor on a vehicle tire and verifying the sensor function of the first tire sensor, Interrogating the first tire sensor to read temperature/ pressure sensor (TPS) values and TPS identifier (TPS_ID), Pairing the TPS_ID with a tire radio radio-frequency identification (RFID), Pairing the TPS_ID & tire RFID with a vehicle chassis ID, Storing, or sending for storage on another apparatus, data pairing each TPS_ID with a vehicle tire RFID and/or with a vehicle chassis ID.

Optionally, the method of example 1 may comprise:

Locating a second tire sensor on a vehicle tire and verifying the sensor function of the second tire sensor, Interrogating the second tire sensor to read temperature/ pressure sensor (TPS) values and TPS identifier (TPS_ID).

Example 2: A method for verifying functionality and performing mapping of a wireless tire sensor by a diagnostic system, wherein the method comprises:

Activating the wireless tire sensor and setting it into diagnostic mode using an assembly line tool, Interrogating the wireless tire sensor to read sensor identification and diagnostic data, Reading a tire RFID, Pairing sensor identification and diagnostic data with the tire RFID, Pairing sensor identification and diagnostic data with a vehicle chassis ID, Mapping sensors using the obtained pairing data, Sending sensor mapping data to vehicle electronic control unit.

According to some additional examples, a control system comprising one or more control units configured to perform the methods according to any of the examples described above is also provided.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A diagnostic system for verifying functionality and performing mapping of one or more wireless sensors in or on a wheel of a heavy-duty vehicle on an assembly line, the system comprising:
   one or more assembly-line tools provided along the assembly line, each assembly-line tool comprising one or more antenna systems arranged to interrogate one or more wireless sensors integrated into or on a wheel of the vehicle, wherein each assembly-line tool is arranged in use to:
   automatically locate on the vehicle and verify a function of the one or more wireless sensors; and
   interrogate at least one of the one or more wireless sensors to perform a wireless sensor reading; and
   pair sensor reading data with a tire identifier (ID),
   pair sensor reading data with a vehicle chassis identifier (ID),
   wherein the diagnostic system maps one or more wireless sensors using wireless sensor readings and provides mapping information for the one or more wireless sensors to a gateway/receiver of an electronic control unit of the vehicle.

2. The diagnostic system of claim 1, wherein the assembly line tool comprises a spindle tool configured to bolt vehicle wheels to a vehicle chassis or a wheel lift configured to lifting vehicle wheels onto an axle of a vehicle chassis.

3. The diagnostic system of claim 1, wherein the assembly line tool is configured to interrogate one or more axle position sensors on a vehicle wheel of a vehicle on the assembly line.

4. The diagnostic system of claim 3, wherein the assembly line tool is configured to interrogate one or more axle position, and stores data which pairs the axle position of the spindle-tool with the sensors detected at that location.

5. The diagnostic system of claim 1, wherein the assembly line tool is further configured to activate a diagnostic mode of a tire pressure and/or tire temperature sensor system of the vehicle on the vehicle assembly line.

6. The diagnostic system of claim 1, wherein one of the antenna systems provided on the assembly line tool comprises a plurality of low frequency antennas spaced around the assembly line tool so as to provide at least one antenna at a location sufficiently close to a tire pressure and temperature sensor to perform a reading of data provided by the tire pressure and sensor.

7. The diagnostic system of claim 1, wherein the data provided by the tire pressure/temperature sensor (TPS) includes a TPS identifier (TPS_ID).

8. The diagnostic system of claim 1, wherein the assembly line tool is configured to read one or more RFID tags located in a vehicle tire or wheel rim.

9. The diagnostic system of claim 1, wherein the assembly line tool configures each TPS_ID to be associated with a vehicle tire RFID and/or a vehicle chassis ID.

10. The diagnostic system of claim 1, wherein the assembly line tool stores data that pairs each TPS_ID with a vehicle tire RFID and/or with a vehicle chassis ID.

11. An assembly-line tool for verifying functionality and performing mapping of one or more wireless sensors in a heavy-duty vehicle on an assembly line at assembly time, the tool comprising: one or more antenna systems arranged to interrogate one or more wireless sensors integrated into or on the vehicle, wherein the assembly-line tool is configured in use to:
   automatically locate and verify a function of the one or more wireless sensors; and
   interrogate at least one of the one or more wireless sensors to perform a wireless sensor reading;
   pair sensor reading data with a tire identifier (ID); and
   pair sensor reading data with a vehicle chassis identifier (ID),
   send the wireless sensor reading to a diagnostic system configured to determine mapping information for the one or more sensors.

12. The assembly line tool of claim 11 comprising a spindle tool configured to bolt vehicle wheels to a vehicle chassis or a wheel lift configured to lifting vehicle wheels onto an axle of a vehicle chassis and interrogate one or more axle position sensors on a vehicle wheel of a vehicle on the assembly line.

13. The assembly line tool of claim 11, wherein the tool is configured to interrogate one or more axle position sensors on a vehicle wheel of a vehicle on the assembly line, and stores data which pairs the axle position of the spindle-tool with the sensors detected at that location.

14. The assembly line tool of claim 11, wherein the tool is further configured to activate a diagnostic mode of a tire pressure and/or tire temperature sensor system of the vehicle on the vehicle assembly line.

15. The assembly line tool of claim 11, wherein one of the antenna systems provided on the spindle tool comprises a plurality of low frequency antennas spaced around the spindle tool so as to provide at least one antenna at a location sufficiently close to a tire pressure and temperature sensor to enable the spindle tool to:

perform a reading of data provided by the tire pressure and sensor, wherein the data provided by the tire pressure/temperature sensor (TPS) includes a TPS identifier, TPS_ID;

read one or more RFID tags located in a vehicle tire or wheel rim;

associate each TPS_ID with a vehicle tire RFID and/or a vehicle chassis ID; and store, or send for storage on another apparatus, data pairing each TPS_ID with a vehicle tire RFID and/or with a vehicle chassis ID.

\* \* \* \* \*